United States Patent [19]

Obata et al.

[11]  4,276,635

[45]  Jun. 30, 1981

[54] PICKUP CARTRIDGE AND MOUNTING DEVICE THEREFOR

[75] Inventors: Shuichi Obata, Kyoto; Masashi Ito, Settsu, both of Japan

[73] Assignee: Matsushita Electric Industrial Co., Ltd., Osaka, Japan

[21] Appl. No.: 123,494

[22] Filed: Feb. 21, 1980

[30] Foreign Application Priority Data

Aug. 23, 1979 [JP]  Japan .............................. 54-35298[U]
Feb. 1, 1980 [JP]  Japan .............................. 55-12398[U]

[51] Int. Cl.³ ........................ H04R 23/02; G11B 3/02
[52] U.S. Cl. ................................................... 369/256
[58] Field of Search ............................. 274/37, 23 R; 179/100.41 K, 100.41 M, 100.41 D, 100.41 Z

[56] References Cited

U.S. PATENT DOCUMENTS

| | | | |
|---|---|---|---|
| 2,938,516 | 5/1961 | Bauer et al. ..................... | 274/23 R |
| 3,051,494 | 8/1962 | Walton ............................. | 274/23 R |
| 3,380,744 | 4/1968 | Ohnishi et al. ................... | 274/23 R |
| 3,954,273 | 5/1976 | Shaper et al. .................... | 274/37 |

FOREIGN PATENT DOCUMENTS

217918  4/1957  Australia .................................... 274/37

*Primary Examiner*—Steven L. Stephan
*Attorney, Agent, or Firm*—Burgess, Ryan and Wayne

[57] ABSTRACT

A pickup cartridge and a pickup cartridge mounting device therefor wherein a plug protrusion of tetragonal sectional area is formed at the rear end of a pickup cartridge, a recess of tetragonal sectional area with at least three walls for receiving the plug protrusion is formed at the front end of a tone arm or the like, and after the plug protrusion is inserted into the recess, the protrusion is strongly clamped between two walls of the recess by a mounting screw. Thus, replacement of pickup cartridges is made easy and reliable.

8 Claims, 10 Drawing Figures

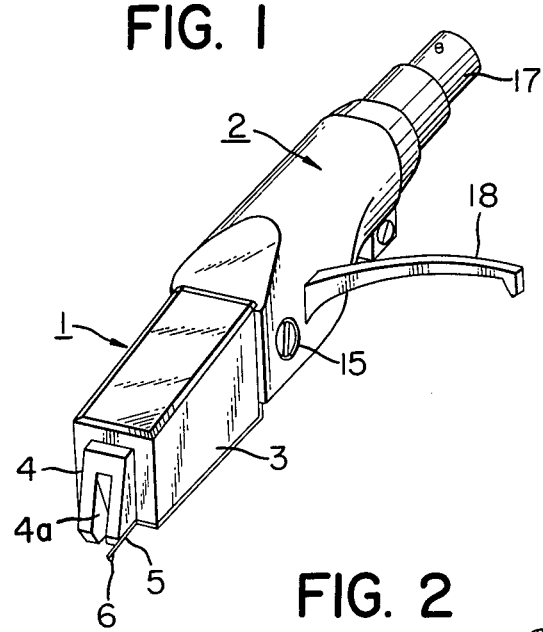
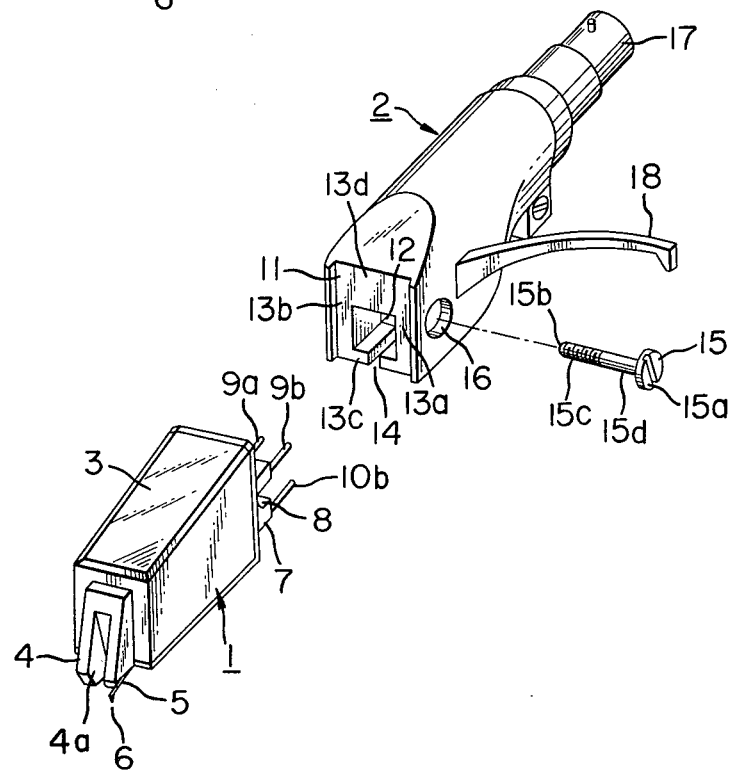

PICKUP CARTRIDGE AND MOUNTING DEVICE THEREFOR

BACKGROUND OF THE INVENTION

The present invention relates to a pickup cartridge and a pickup cartridge mounting device therefor for facilitating replacement of the pickup cartridge alone.

A conventional tone arm is pipe-shaped and has an electric connector for connecting the pickup cartridge to a circular recess at its front end. Therefore, for mounting a replaceable pickup cartridge to the front end of the tone arm, the pickup cartridge is made replaceable by forming it integrally with a head shell having a plug at its rear end, this plug to be inserted in the circular recess of the front end of the tone arm and to be electrically connected to the inner electric connector. Then the pickup cartridge is mounted by clamping an annular lock nut at the tone arm front end.

As far as the replaceable cartridge itself is concerned, if the pickup cartridge portion and the head shell portion are formed integrally with each other as mentioned above, replacement of the pickup cartridge can be costly since the head shell must also be replaced. In view of this, it is a general practice, at present, to detachably mount the pickup cartridge to the head shell, and to integrally form the head shell to the tone arm front end in advance, or to detachably mount it to the tone arm front end using the above-mentioned lock nut. Thus, the head shell itself is used as an accessory. The pickup cartridge is generally mounted to the head shell in such a manner that it is detachably attached to the undersurface of the head shell by being clamped by two mounting screws from the top surface of the plate-shaped head shell. However, such a structure is disadvantageous in that the mounting of the cartridge to the head shell is not dependable, since the mounting condition varies with the clamping tightness of the two mounting screws. It is also difficult to correctly ascertain the verticality of the stylus tip of the pickup cartridge. Although the two mounting screws are clamped symmetrically about the central axis of the pickup cartridge, their clamping positions will be laterally shifted at both sides of the central axis if their degrees of clamping tightness to the head shell are different. Thus, such a structure is disadvantageous in that jolting may be caused which results in the generation of abnormal resonance, or the stylus may be off the central axis and lose its verticality.

SUMMARY OF THE INVENTION

Accordingly, one of the objects of the present invention is to provide a pickup cartridge and a mounting device therefor which solves the problems of the conventional devices.

Another object of the present invention is to provide a pickup cartridge mounting device which can securely mount a replaceable pickup cartridge to a tone arm or to a head shell.

In accordance with the present invention, mounting bodies are used which consist of a tone arm having a tetragonal recess with at least three walls for receiving a tetragonal plug protrusion disposed at the rear end of the pickup cartridge, a head shell and a socket. Since the mounting of a pickup cartridge may be accomplished simply by clamping a mounting screw through the tetragonal recess, it is evident that the mounting is easy and a pickup cartridge may be simply constructed with improved verticality and without eccentricity. Since the opposite walls of the tetragonal recess are elastically deformed by clamping the mounting screw, mounting is secure and generation of abnormal resonance is prevented. Further, since the electric connector is built-in, connection errors of lead wires may be advantageously prevented.

BRIEF DESCRIPTION OF THE DRAWINGS:

FIG. 1 is a perspective view illustrating a first embodiment of a pickup cartridge mounting device in accordance with the present invention;

FIG. 2 is a perspective view of the device of FIG. 1 under assembly;

FIG. 3A is a top view,

FIG. 3B is a left side view and

FIG. 3C is a rear view thereof;

Figure 3A:
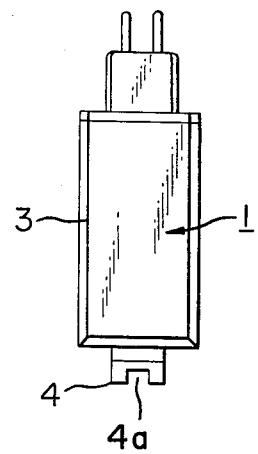
FIGS. 3A–3C shown an example of the pickup cartridge used in the device of FIG. 1.
Figure 3B:
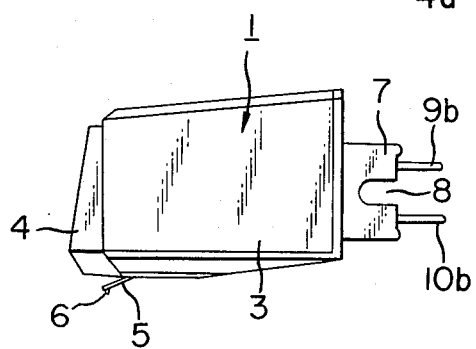
Figure 3C:
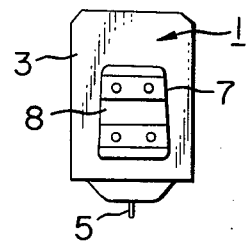
Figure 4:
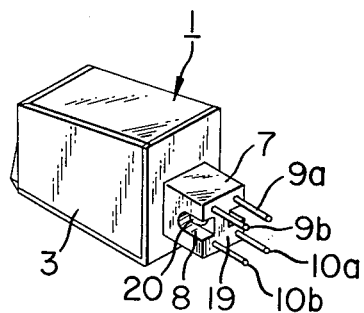
FIG. 4 is a perspective view illustrating another example of a pickup cartridge which may be used in the device of FIG. 1.

DESCRIPTION OF THE PREFERRED EMBODIMENTS:

FIGS. 1 and 2 show an embodiment of the pickup cartridge mounting device of the present invention wherein numeral 1 denotes a pickup cartridge and numeral 2, a head shell. The pickup cartridge 1 has a box-shaped body 3 with a stylus tip guard 4 at its front end for protecting a stylus tip 6 of a cantilever 5. A vertical slit 4a is formed in the stylus tip guard so that the stylus tip 6 may be seen. A tetragonal plug protrusion 7 made of non-conductive material is formed at the rear end face of the box-shaped body 3 and has a horizontal recess 8. Pairs of output terminals 9a, 9b and 10a, 10b are, respectively, formed at the rear ends of the plug protrusion 7 separated by the recess 8. As shown in FIGS. 3A–3C, the tetragonal plug protrusion 7 has a pair of side faces which are horizontally parallel to each other, and a pair of vertically inclined side faces which taper toward each other forming, as a whole, a substantially trapezoidal shape. The head shell 2 has a recess 11 at its front end face for engaging with the rear end of the box-shaped body 3 of the pickup cartridge. A tetragonal recess 12 is formed in the recess 11 for engaging with the tetragonal plug protrusion 7 of the pickup cartridge 1. The tetragonal recess 12 is trapezoidal, in correspondence with the tetragonal plug protrusion 7. The recess 12 is defined by surrounding four walls 13a, 13b, 13c and 13d. A slit 14 is formed in the horizontal wall 13c in the axial direction of the head shell 2. Vertically opposed walls 13a and 13b of the recess 12 are slightly elastic. An electric connector (not shown), with terminals to be connected to the output terminals 9a, 9b, 10a and 10b of the tetragonal plug protrusion 7, is disposed in the tetragonal recess 12. The front end face of the electric connector constitutes the bottom surface of the tetragonal recess 12. Holes (not shown) are formed in the vertically opposed walls 13a and 13b of the tetragonal recess 12 for a mounting screw 15. A recess 16 for accomodating a head portion 15a of the mounting screw 15 is formed on the outer surface of one of these walls, the wall 13a. The mounting screw 15 has a shaft portion 15b integral with the head portion 15a. A threaded part 15c of larger diameter than a neck portion 15d is formed at the front end of the shaft portion 15b. A circular plug 17 is mounted at the rear end of the head shell 2. The circular plug 17 engages with the front end of a known tone arm (not shown) and is securely clamped thereto by a lock nut. The head shell 2 has a manual control bar 18 for displacing the pickup cartridge 1 toward or away from a record.

In a pickup cartridge mounting device of this construction, the tetragonal plug protrusion 7 at the rear end of the body 3 of the pickup cartridge engages with the tetragonal recess 12 and with the recess 11 formed at the front end of the head shell 2. Thus, the output terminals 9a, 9b, 10a and 10b disposed at the plug protrusion 7 are connected to the electric connectors disposed in the recess 12. By tightening the mounting screw 15 in the hole formed in the head shell 2, the walls 13a and 13b of the head shell 2 are drawn toward each other, and the pickup cartridge 1 is thus mounted on the head shell 2. The mounting screw 15 crossing the recess 12 lies in the recess 8 of the tetragonal plug protrusion 7 engaged with the recess 12. By tightening the mounting screw 15, the trapezoidal plug protrusion 7 may be securely held in the trapezoidal recess 12.

In the above embodiment, the horizontal recess 8 was formed in the tetragonal plug protrusion 7 of the pickup cartridge 1. However, mounting of the pickup cartridge 1 to the head shell 2 may similarly be accomplished by the mounting screw 15 with a wall 19 having a through hole 20 disposed in the recess 8.

Figure 5:
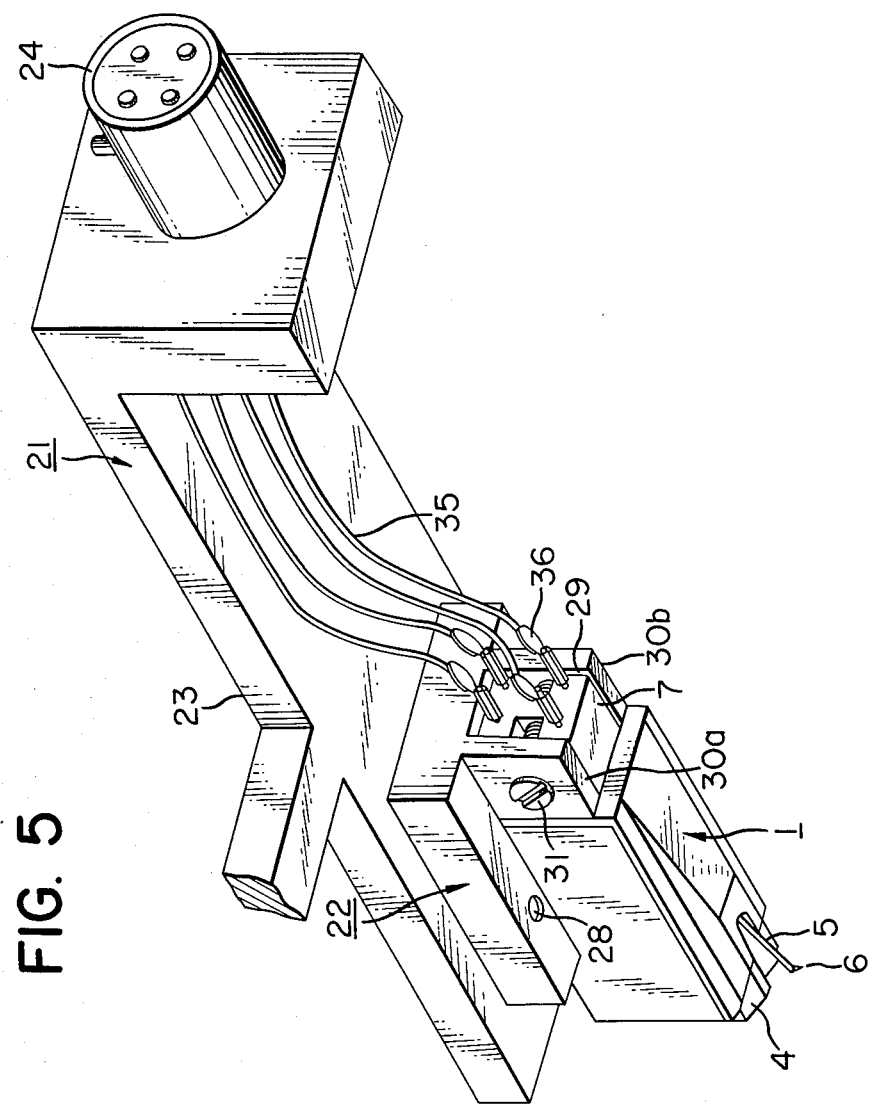
FIG. 5 is a perspective view illustrating another embodiment of the pickup cartridge mounting device of the present invention.
Figure 6:
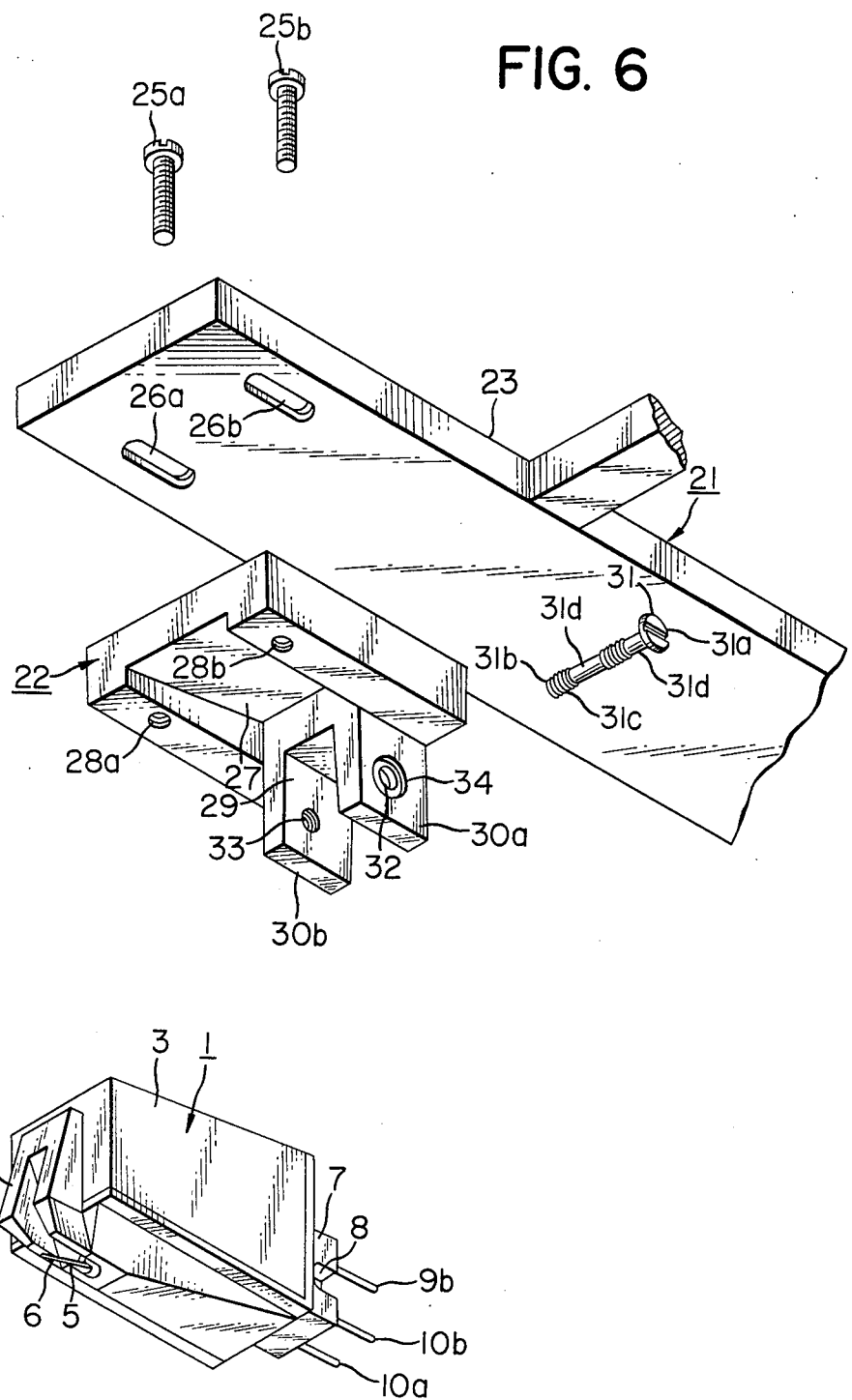
FIG. 6 is a perspective view of the device of FIG. 5 under assembly.

FIGS. 5 and 6 show another embodiment of the present invention wherein numeral 21 denotes a head shell, and numeral 22, a socket for mounting the pickup cartridge to the head shell 21. The head shell 21 has, at its front end, a plate-shaped portion 23 and, at its rear end, a circular plug 24 to engage with a tone arm of known type which is secured thereto by a lock nut. The plate-shaped portion 23 has elongated holes 26a and 26b for inserting mounting screws 25a and 25b for mounting the socket 22. The socket 22 has a tapered recessed surface 27 for receiving a tapered top surface of the pickup cartridge 1, and screw holes 28a and 28b at each side of the tapered recessed surface 27 for receiving the mounting screws 25a and 25b. At the rear side of the tapered recessed surface 27 there is a recessed portion 29 for receiving the plug protrusion 7 of the pickup cartridge 1. The recessed part 29 has mutually opposed walls 30a and 30b which, in turn, have holes 32 and 33 for inserting a mounting screw 31. The outer face of the wall 30a has a part 34 for receiving the head portion 31a of the mounting screw 31. The mounting screw 31 is hard to pull out of the wall 30a once it is screwed in, since the diameter of its shaft portion 31b is greater at its threaded portion 31c at the front end that at its neck portion 31d.

In a pickup cartridge mounting device of this construction, the socket 22 is securely attached to the head shell 21 by the mounting screws 25a and 25b. The pickup cartridge 1 is securely attached to the socket 22 by the mounting screw 31. The pickup cartridge 1 may be replaced by tightening or loosening the mounting screw 31. In replacing the pickup cartridge 1, the mounting screw 31 is not removed from the wall 30a and its front end remains in the recess 29, but this does not interfere with the replacement of the pickup cartridge 1 since the cartridge has a recess 8 in its plug protrusion 7. Terminals 36 at the front ends of lead wires 35 connected to the circular plug 24 are connected to the output terminals 9a, 9b, 10a and 10b at the rear end of the plug protrusion 7.

Figure 7:
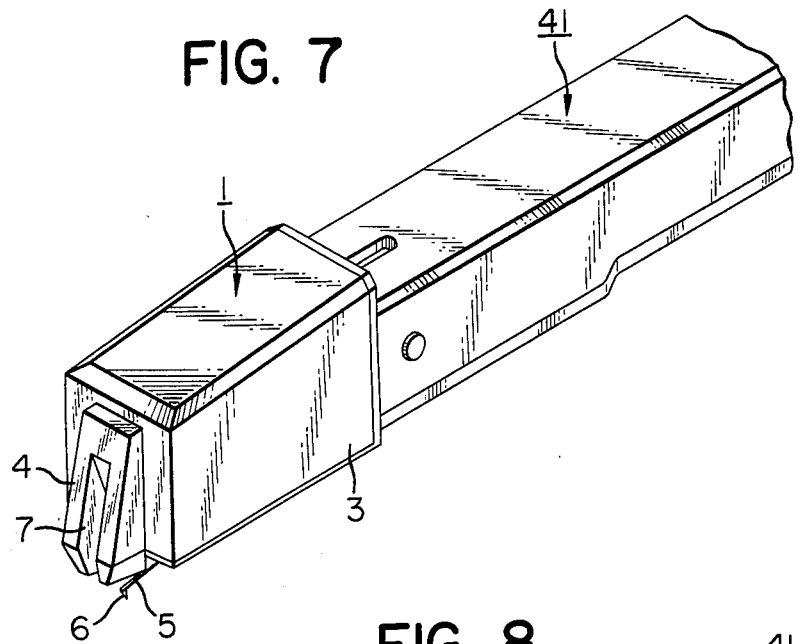
FIG. 7 is a perspective view illustrating still another embodiment of the pickup cartridge of the present invention.
Figure 8:
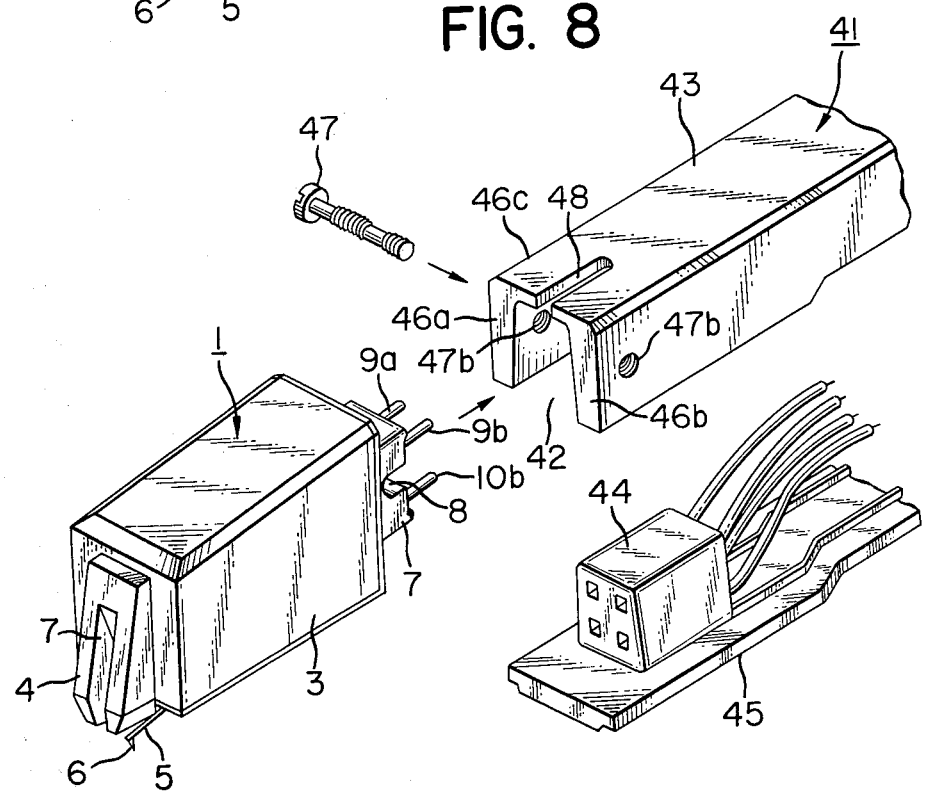
FIG. 8 is a perspective view of the cartridge of FIG. 7 under assembly.

FIGS. 7 and 8 show still another embodiment of the present invention wherein numeral 41 denotes a tone arm which has, at its front end, a tetragonal recessed part 42 to engage with the plug protrusion 7 at the rear end of the pickup cartridge 1. The tetragonal recessed part 42 is defined by a tone arm body 43 having an inverted U-shaped sectional area and by a plate-shaped body 45 with an electric connector 44 mounted on it. The tetragonal recess 42 has holes 47a and 47b for inserting a mounting screw 47 through opposing walls 46a and 46b of the tone arm body 43, and an axial slit 48 is disposed in the upper wall 46c.

In a pickup cartridge mounting device with such a structure, each of the output terminals 9a, 9b, 10a and 10b are inserted into the electric connector 44 disposed in the tetragonal recessed part 42 by engaging the plug protrusion 7 of the pickup cartridge 1 with the tetragonal recessed part 42 at the front end of the tone arm 41. By tightening the mounting screw 47 in the holes 47b and 47a at the front end of the tone arm 41, the walls 46a and 46b are clamped toward each other and mounting of the cartridge 1 is completed.

We claim:

1. A pickup cartridge mounting device comprising:
   a pickup cartridge having at its rear end a plug protrusion having a trapezoidal cross-sectional area, and having a recess through it in a direction perpendicular to the axial direction of the cartridge,
   a pickup cartridge mounting member having a recess with a matching trapezoidal cross-sectional area for receiving said plug protrusion, formed at the front end of said pickup cartridge mounting member, said recess having at least three walls,
   a mounting screw extending through two of said walls and through said recess in said pickup cartridge plug protrusion for clamping said plug protrusion between said two walls by drawing said two walls toward each other, said two walls being elastically deformable.

2. A pickup cartridge mounting device as set forth in claim 1 wherein a tone arm is used as a pickup cartridge mounting member.

3. A pickup cartridge mounting device as set forth in claim 1 wherein a head shell formed at the front end of a tone arm is used as a pickup cartridge mounting member.

4. A pickup cartridge mounting device as set forth in claim 1 wherein a socket formed in a head shell at the front end of a tone arm is used as a pickup cartridge mounting member.

5. A pickup cartridge mounting device as set forth in claim 1, 2, or 3 wherein an electric connector is disposed in a recess of trapezoidal cross-sectional area and is connected to output terminals at the rear face of the plug protrusion at the rear end of the pickup cartridge.

6. A pickup cartridge mounting device as set forth in claim 1 wherein the top and bottom surfaces of said recess are parallel to each other and in alignment with the clamping direction of the mounting screw, and the side faces are inclined at predetermined angles with respect to these sides to form tapered sides.

7. A pickup cartridge having: a box-shaped body protruding in such a manner that a cantilever disposed at the undersurface of its front end is angularly movable; a plug protrusion with a trapezoidal cross-sectional area protruding backward from the rear face of the box-shaped body; a plurality of output terminals protruding backward from the rear end of the plug protrusion; and a horizontal recess formed through said plug protrusion perpendicular to the protruding direction.

8. A pickup cartridge as set forth in claim 7 wherein two recesses are formed in said plug protrusion, a blocking wall is formed between the recesses, and the blocking wall has a through hole communicating the recesses.

* * * * *

UNITED STATES PATENT AND TRADEMARK OFFICE
CERTIFICATE OF CORRECTION

PATENT NO. : 4,276,635

DATED : June 30, 1981

INVENTOR(S) : Shuichi Obata, et al

It is certified that error appears in the above—identified patent and that said Letters Patent is hereby corrected as shown below:

Column 3, line 62: "that" should be --than--

Signed and Sealed this

Thirtieth Day of March 1982

[SEAL]

Attest:

Attesting Officer

GERALD J. MOSSINGHOFF

Commissioner of Patents and Trademarks